April 11, 1944.  J. G. HOLMSTROM ET AL  2,346,164
CHAIN-DRIVEN TANDEM REAR AXLE VEHICLE
Filed Sept. 4, 1942  4 Sheets-Sheet 1

INVENTORS.
John G. Holmstrom
BY Wallace M. Brown

April 11, 1944.  J. G. HOLMSTROM ET AL  2,346,164
CHAIN-DRIVEN TANDEM REAR AXLE VEHICLE
Filed Sept. 4, 1942  4 Sheets-Sheet 2

INVENTORS.
John G. Holmstrom
BY Wallace M. Brown

April 11, 1944.   J. G. HOLMSTROM ET AL   2,346,164
CHAIN-DRIVEN TANDEM REAR AXLE VEHICLE
Filed Sept. 4, 1942   4 Sheets-Sheet 3
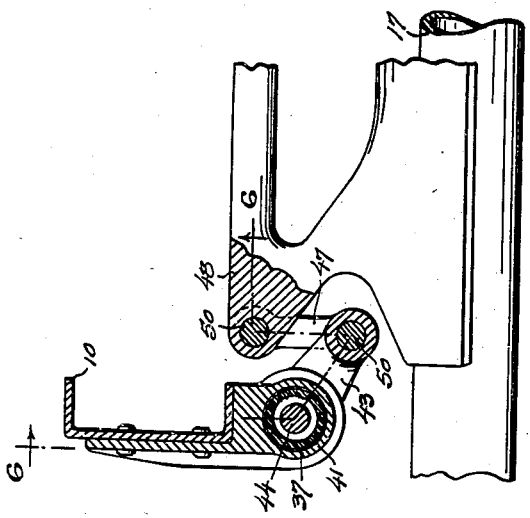
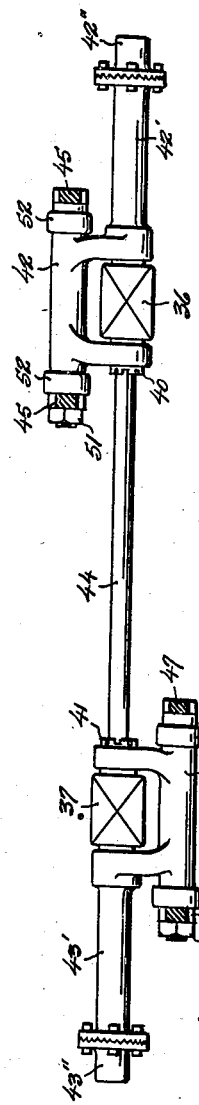
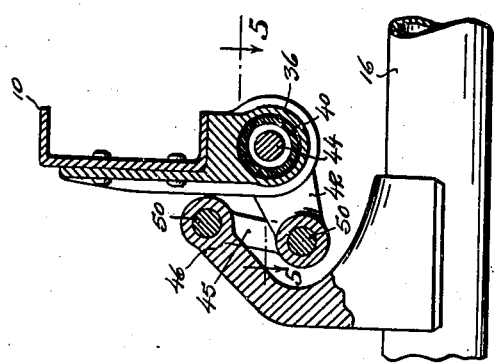
INVENTORS.
John G. Holmstrom
BY Wallace M. Brown

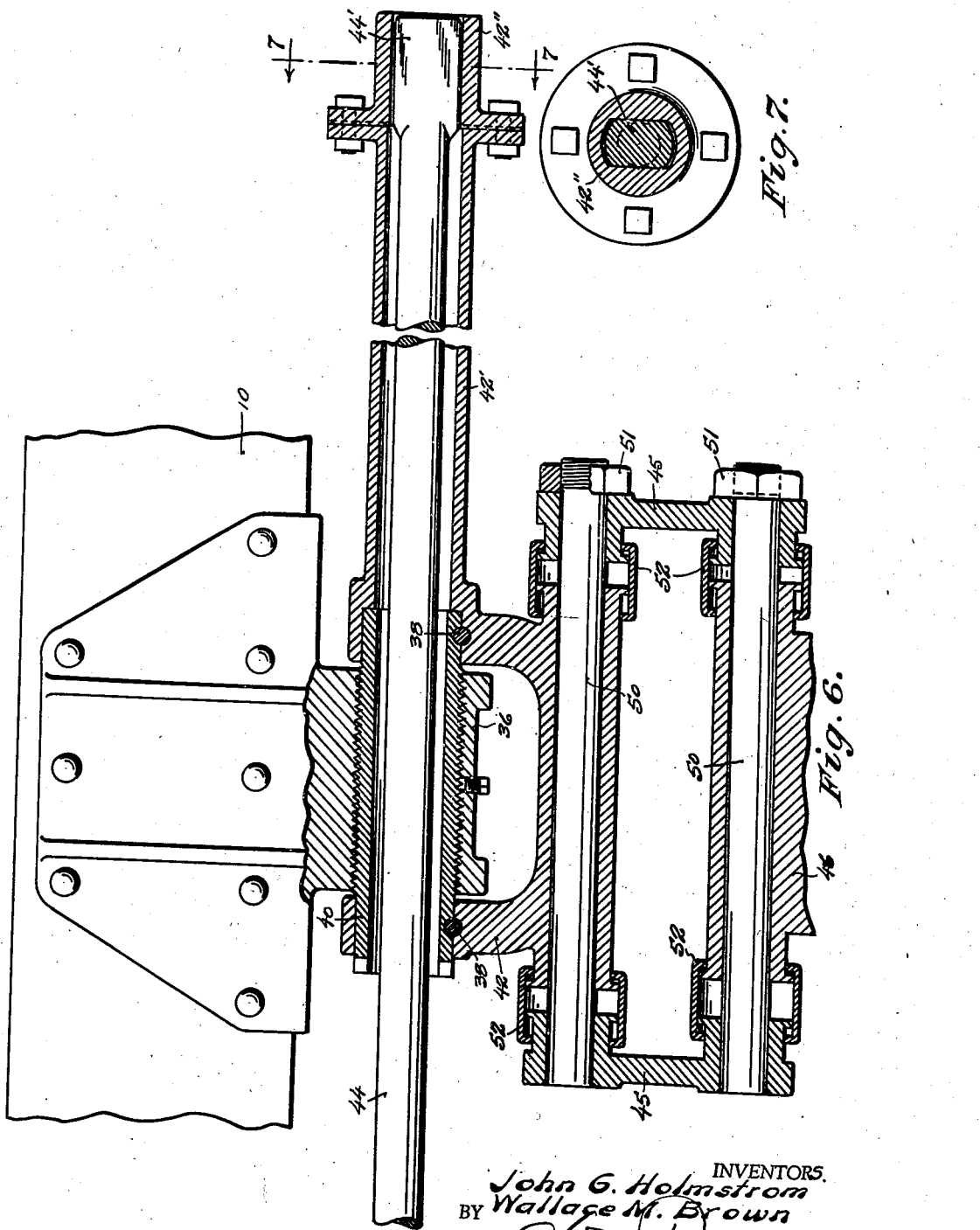

Patented Apr. 11, 1944

2,346,164

UNITED STATES PATENT OFFICE 2,346,164

CHAIN-DRIVEN TANDEM REAR AXLE VEHICLE

John G. Holmstrom and Wallace M. Brown, Seattle, Wash., assignors to Kenworth Motor Truck Corporation, Seattle, Wash., a corporation of Washington Application September 4, 1942, Serial No. 457,529

20 Claims. (Cl. 180—22)

This invention relates to chain-driven tandem rear axle vehicles, and its principal object is to provide a vehicle of this nature having, as the mechanism by which the axle housings of the tandem rear wheels are suspended from the vehicle main frame, a perfected load-equalizing hook-up including torsion rods as the spring agent.

It is a further and more particular object, in a tandem rear axle vehicle of the described character having a driving sprocket wheel common to both rear axles and located intermediate the same and which is employed in conjunction with adjustable radius rods for maintaining a given spacing between the axial centers of the driving and driven sprocket wheels, to provide improvements in the shackling connections through which a responsive wind-up is imparted from the axles to the torsion rods. These improvements, more especially, permit the shackles to shift longitudinally in relation to the main frame as well as the related axles of the vehicle and by such shifting serve the two-fold end of, firstly, accommodating relative fore-and-aft movement of the tandem rear wheels as the latter are swingably influenced by vehicle operation about the common driving sprocket wheel as an axis, and secondly, to compensate for variations in the swinging radius of the tandem rear wheels resultant of adjustments made in the lengths of the radius rods for maintaining the driving chains in a state of required tautness.

It is a further object still to substantially bodily engineer into a chain-driven tandem rear-axle vehicle the improvements in torsion-rod springing illustrated and described in our Letters Patent of the United States No. 2,333,008, of issue date October 26, 1943.

With the foregoing and somewhat general objects in view, and having further more particular objects and advantages in mind which will become apparent in the course of the following description and claims, the invention consists in the novel construction and in the adaptation and combination of parts illustrated in the accompanying drawings and hereinafter described and claimed.

Figure 1:
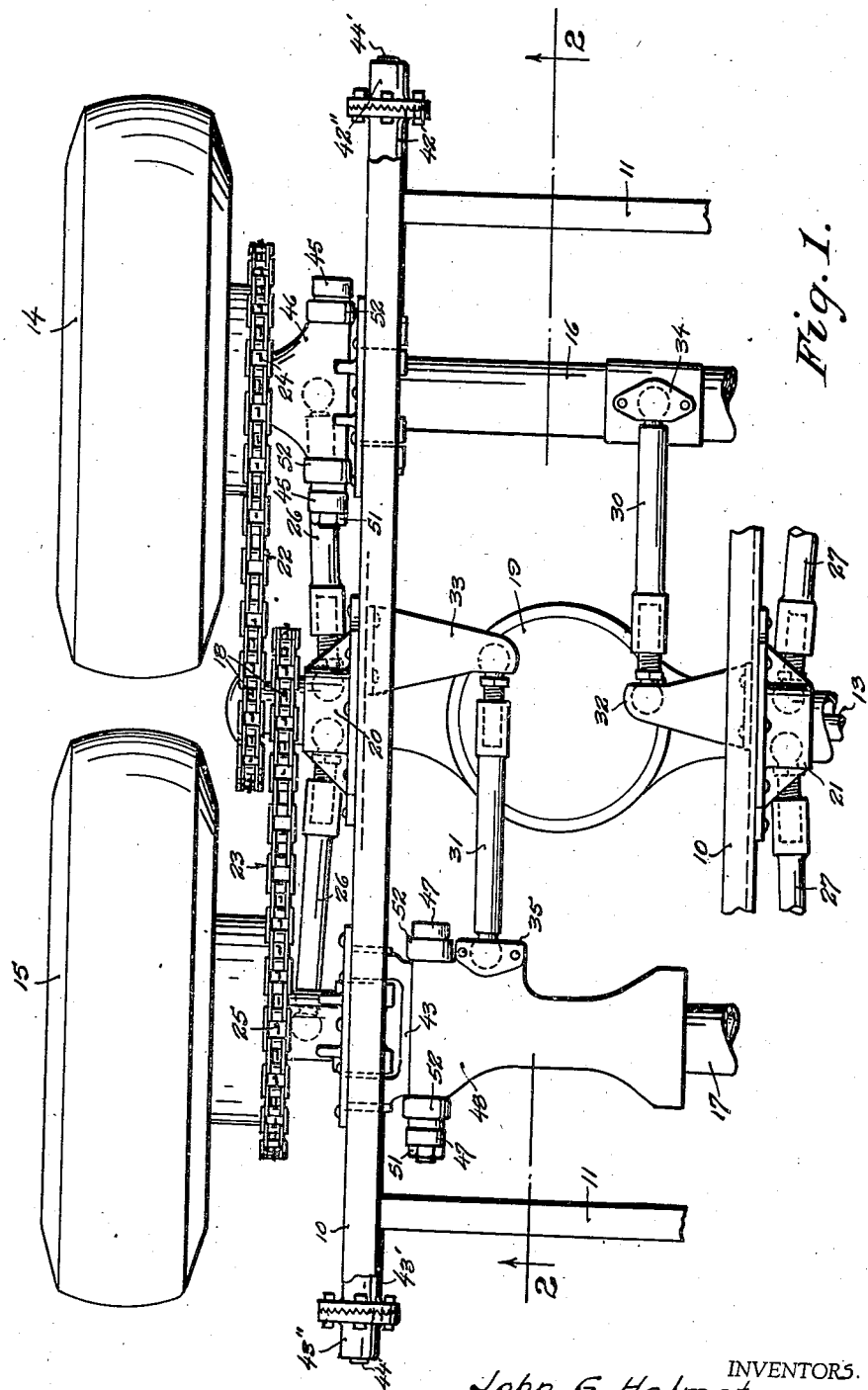
Figure 1 is a fragmentary top plan view of a chain-driven tandem rear axle vehicle constructed in accordance with the now preferred embodiment of the invention.
Figure 2:
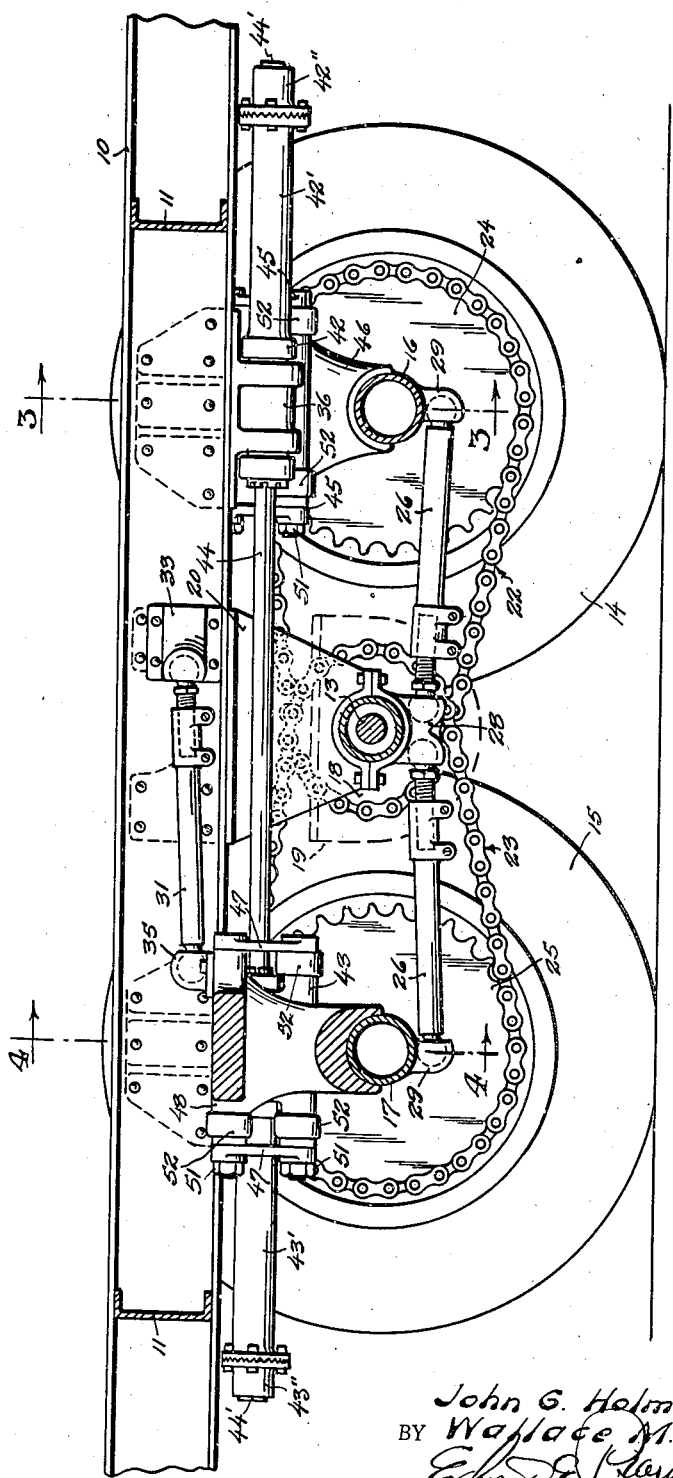
Fig. 2 is a fragmentary longitudinal vertical section on line 2—2 of Fig. 1.

Fig. 3 is a transverse vertical section taken to an enlarged scale on line 3—3 of Fig. 2 to detail the stress-transfer connections between the torsion rod and one of the tandem rear axles; and Fig. 4 is a similar section on line 4—4 of Fig. 2 detailing the functional counterpart of these connections coupling the torsion rod and the other tandem rear axle in a manner imparting a wind-up to the torsion rod opposed as to, its rotational direction from that imparted from the first-named connections.

Fig. 5 is a somewhat schematic horizontal sectional view taken to a reduced scale on line 5—5 of Fig. 3, the figure essentially illustrating the oppositely directed lever arms for the tandem rear axles, bearings therefor, and the connecting torsion rod.

Fig. 6 is a lay-out horizontal sectional view taken to an enlarged scale on the jogged line 6—6 of Fig. 4 to detail the construction features of the stress-transfer connections between axle and torsion rod; and Fig. 7 is a detail transverse vertical section on line 7—7 of Fig. 6.

With reference being had to said drawings, the numeral 10 indicates the main-frame side girders of the vehicle having the usual cross-channel connections 11. The tandem rear wheels, fitted with the usual tires 14 and 15, find a journal upon the outer ends of axle housings 16 and 17 extending transversely of the vehicle, and designated at 19 is a housing—disposed intermediate the axle housings—which receives differential gearing driven in the usual or a suitable manner from a propeller shaft (not shown) and in turn drives jack-shafts 13. Mounted upon the jack-shafts at each side of the vehicle exteriorly of the side girders are paired sprocket wheels 18. 20 and 21 denote frame-suspended side brackets holding the housings for the jack-shafts. From said sprocket wheels 18 chains 22 and 23 are carried about sprocket wheels 24 and 25 fixed one to one and the other to the other of the two tandem rear wheels, and supporting the axle housings 16—17 to hold the same to a constant swinging radius are sets of radius rods having their ball extremities knuckle-mounted at respective outer ends to the axle housings and at inner ends to the frame. We provide three radius rods for each axle housing of which two are disposed exteriorly of and at opposite sides of the frame occupying a common horizontal plane located below and in paralleling relation to a horizontal plane taken through the axes of the related driving and driven sprocket wheels, and of which the third lies between the frame girders above and in paralleling relation to said swinging radius of the related axle. The two lower radius rods are denoted by 26 and 27, and as supporting knuckles therefor we represent respective brackets 28 and 29 of which the former is formed as an integral dependency of the bearing bracket 20 or 21, as the case may be, and the latter fixedly secured to the related axle housing. Indicated by 30 and 31, the upper radius rod of the two sets is socketed at its inner end in the knuckle-mounting of a respective frame-carried bracket, as 32 and 33, and at the outer ends find a socket in knuckle-mountings fixed to a related axle housing, this last-named knuckle-mounting in the one instance being provided by a bracket 34 supported directly from the housing and in the other instance by a bracket 35 carried upon an axle-fixed perch which will be hereinafter identified by numeral in connection with the description of the torsion-rod suspension. Each of the radius rods, for the self-evident purpose of keeping the chains in a condition of required tautness, has one of its ball extremities longitudinally adjustable with respect to the rod proper.

Now describing the torsion-rod suspension, it will be seen that there is rigidly hung from the frame to lie in the approximate plane of the respective axles a pair of co-axial bearings 36 and 37 which, desirably, are of the internally threaded character now finding considerable favor in wrist applications for resistance of thrust. Threadedly introduced to each such bearing is a thimble, as 40 and 41, and coupled by pins 38 to the thimbles are respective lever arms 42 and 43 of which the one is directed in a general horizontal plane laterally outwardly and the other in a general horizontal plane laterally inwardly. Integral with the lever arms and arranged to extend longitudinally from the bearings in co-axial relation thereto are tubular prolongations 42' and 43', and formed upon the outer extremities of the prolongations are head elements 42" and 43". Provided within the head elements are oblong sockets, and fitting in such sockets and operating to torsionally couple the lever arms to a torsion-rod 44 are correspondingly shaped extremities 44' of the rod, the rod being carried from one to the other lever arm through the thimbles and tubes, which is to say through the bores of the latter.

Shackled by links 45 to the free end of the lever arm 42 is a perch 46 which is given a fixed mounting on the axle housing 16, and similarly shackled by links 47 to the free end of the lever arm 43 is a perch 48 fixedly mounted on the other axle housing 17. There are two of the former such perches located exteriorly of the frame girders at opposite sides of the vehicle whereas the complements thereof and which lie interiorly of the frame are formed as a unit casting. The perches are, preferably, carried in each instance above the free ends of the related lever arms.

Characterizing the pivot connections as between perch-and-shackle and shackle-and-lever, and by such characteristic permitting the hereinbefore mentioned fore-and-aft movement of the perches in relation to the lever arms and as may be caused either by an adjustment in the lengths of the radius rods for elimination of chain slack or by swinging movement of the axles about the jack-shafts as an axis under vehicle operation, we employ slidably mounted pins 50, engineering the same such that the combined end-play of the two pins of each shackle hook-up is somewhat in excess of the length of a single chain link, thereby to admit, as wear demands, removal of two following links from the chains. It will of course be understood that a combined sliding movement of the two complementing pivot pins in exact correspondence with the length of one of the two chain links to be removed would suffice for the purpose inasmuch as the removal of the links would be resorted to only as the perch and the lever arms had been given relative longitudinal movement—compensating chain wear—to the extreme of the slide adjustment.

Detailed in Fig. 6, the shackle links are paired to lie at opposite ends of the related perch and lever arm and are rigid with the pivot pins with one end of the latter welded to one of the links and the other link brought by a clamping nut 51 against a shoulder formed at the opposite end of the pin. Each said link is provided upon its inner face with a flanged lip corresponding to a like flange produced upon the perch or lever arm, as the case may be, and fitting over such lips to operate as grease retainers are floating split covers 52.

It is thought to be clear that the illustrated and described structure is one effectively adapting torsion-rod springing to chain-driven tandem rear axle vehicles. The operation is believed to have been clearly understood from the foregoing description and, insofar as the torsion-rod springing is concerned, being similar to the assembly illustrated and described in our before-identified pending application, the two axles imparting their torsional wind-up to the torsion rod in opposite directions of rotation with the rod itself being of a full-floating nature entirely free of a torsion-resisting frame-anchor and transmitting to the vehicle frame only a perpendicular mean of the resisting forces built up within the rod by its torsional twist.

While we have herein described a chain-driven tandem rear axle vehicle in accordance with what we now consider to be our preferred embodiment, various departures will readily occur to those versed in the art, and it is accordingly our intention that no limitations be read into the hereto annexed claims excepting as the same are expressly introduced thereto to distinguish from such prior knowledge as the art may evince.

What we claim, is:

1. In a chain-driven tandem rear-axle vehicle, in combination with the tandem rear axles and their wheels, the driving chains, and a vehicle main frame: mechanism for spring-suspending the axles from the frame including torsion rods supported for torsional movements about axes fixed in relation to the frame; and frame-carried devices engaging the tandem rear axles and in the respective instance guidably supporting the vehicle wheels for vertical swinging movements about an axis corresponding to the rotational axis of the respective sprocket wheel from which the related chain derives its driving impulse, said guiding devices comprising, for each axle, a set of three radius rods two of which are applied at the opposite ends of the axle and, considered in top plan, extend oblique to one another and to the longitudinal center line of the frame and of which the other rod is applied between the two end radius rods and occupies a position paralleling said longitudinal center line.

2. In a chain-driven vehicle, in combination with the vehicle rear wheels, a through-axle therefor, the driving chains, and a vehicle main frame: mechanism for spring-suspending the wheels from the frame including torsion rods supported for torsional movements about axes fixed in relation to the frame; and frame-carried devices engaging the axle and guidably supporting the same for vertical swinging movements about an axis corresponding to the rotational axis of the sprocket wheels from which the chains derive their driving impulse, said guiding devices comprising a set of three radius rods two of which are applied at the opposite ends of the axle and, considered in top plan, occupy vertical planes oblique to the longitudinal center line of the frame and of which the other radius rod is applied at a point intermediate the two end radius rods and occupies a vertical plane approximately paralleling said longitudinal center line.

3. As suspension mechanism for a chain-driven vehicle wheel fitted with a driven sprocket wheel and deriving its chain drive from a driving sprocket wheel longitudinally offset therefrom, the combination with the vehicle wheel, the chain, the sprocket wheels, and a vehicle frame: devices supporting the wheel for vertical swinging movement about the driving sprocket wheel as an axis; and a spring suspension for the wheel providing a torsion rod supported for torsional movement about an axis fixed in relation to the frame and operatively interconnected with the wheel for torsionally responding to vertical movements of the wheel, means being provided in the connection between the wheel and the torsion rod compensating for swing-responsive longitudinal movement of the wheel.

4. As suspension mechanism for a chain-driven vehicle wheel fitted with a driven sprocket wheel and deriving its chain drive from a driving sprocket wheel longitudinally offset therefrom, the combination with the vehicle wheel, the chain, the sprocket wheels, and a vehicle frame: devices guiding the wheel for vertical swinging movements about the driving sprocket wheel as an axis; and a spring suspension for the vehicle wheel providing a torsion rod supported for torsional movement about an axis fixed in relation to and longitudinal as respects the frame and operatively interconnected with the vehicle wheel for torsionally responding to vertical movements of the lattter, said operative interconnection between the torsion rod and the vehicle wheel comprising a lever arm anchored to the rod and journaled from the frame for rocker movement about an axis coinciding with the torsional axis of the rod, a wheel-carried perch, respective pins received for pivotal and sliding movements in the perch and in the free end of the lever arm, and links fixedly secured to the pins and shackling the perch to the lever arm.

5. In a chain-driven tandem rear-axle vehicle, in combination with the dual rear axles, the axle housings, an engine-driven jack-shaft supported from the frame of the vehicle to lie intermediate the rear axles, said vehicle frame, sprocket wheels for the jack-shaft and the axles, and the driving chains: sets of frame-carried radius rods for each axle supporting the axle-mounted sprocket wheels for vertical swinging movements about the jack-shaft as an axis, said radius rods of each set, considered in top plan, being disposed to occupy vertical planes oblique to one another; frame-carried levers for the respective axle housings journaled for rocker movements about a common longitudinal axis; a torsion spring extending between and connected at its ends to the two levers for torsional movement about an axis coinciding with the rocket axis of the levers; and connections from the axle housings to the related levers acting by like directive movements of the former to impart opposite rotational tendencies to the two ends of the spring.

6. In a chain-driven tandem rear-axle vehicle, in combination with the dual rear axles, the axle housings, an engine-driven jack-shaft disposed intermediate the rear axles, driving chains from the jack-shaft to the rear axles, and a vehicle main frame: frame-carried devices supporting the axle housings for vertical swinging movements about the jack-shaft as an axis; frame-carried levers for the respective axle housings journaled for rocker movements about a common longitudinal axis and extending in opposite directions laterally therefrom; a torsion spring extending between and connected at its ends to the two levers for torsional movements about an axis coinciding with the rocker axis of the levers; a perch fixed to each of the axle housings; respective pins journaled for pivotal and sliding movements in each of the perches and in each of the free ends of the levers; and shackle linkage connecting the pins of a related perch and lever arm for imparting, through the levers, opposite rotative tendencies from the two axles to the two ends of the torsion spring.

7. In a chain-driven tandem rear-axle vehicle, in combination with the dual rear axles, the axle housings, a vehicle frame, an engine-driven jack-shaft supported from the frame to lie intermediate the rear axles, and driving chains from the jack-shaft to each of the rear axles: frame-mounted radius rods supporting the axle housings for vertical swinging movements about the jack-shaft as an axis; frame-carried levers for the respective axle housings journaled for rocker movements about a common longitudinal axis and extending in opposite directions laterally therefrom; a torsion spring extending between and connected at its ends to the two levers for torsional movements about an axis coinciding with the rocker axis of the levers; a perch fixed to each of the axle housings; respective pins journaled for pivotal and sliding movements in each of the perches and in each of the lever arms; and shackling links fixedly secured to the pins and connecting the pins of a related perch and lever arm for imparting, through the lever arms, opposite rotative tendencies from the two axles to the two ends of the torsion spring.

8. A vehicle construction as defined in claim 7, said pins constituting slide-joints between the links and the pieces to which the same are shackled, and having floating grease retainers received over said sliding joints of the shackled pieces.

9. In a chain-driven tandem rear-axle vehicle, in combination with the dual rear axles: a vehicle main frame providing, at each side of the vehicle, a longitudinally extending girder; a differential disposed intermediate the rear axles; frame-supported jack-shafts extending from the differential and each supporting a pair of driving sprocket wheels to locate the latter exteriorly of the frame girders; chain-driven sprocket wheels for the dual rear axles disposed exteriorly of the frame girders in longitudinal alignment with a related one of the paired driving sprocket wheels; said chains; sets of frame-anchored radius rods for each of the rear axles occupying planes above and below and in paralleling relation to a horizontal plane taken through the axes of the related driving and driven sprocket wheels, corresponding as to length with the spacing between said sprocket-wheel axes, and having their frame anchors located in the general area of the jack-shafts; a pair of frame-carried levers journaled for rocker movement about a common longitudinal axis immediately below each frame girder in the approximate vertical planes of the axles and extending in opposite directions laterally therefrom; a torsion spring at each side of the vehicle extending between and anchored at its ends to the related levers of each pair for torsional movements about an axis coinciding with the rocker axis of the levers; perches related to the several levers fixed to the axle housings and extending upwardly beyond the free ends of the levers to terminally overhang the latter; pins journaled for pivotal and sliding movements in each of the perches and in the free ends of each of the levers; and shackle linkage fixedly secured to the pins and connecting the related perches and levers for imparting, through the levers, opposite directive tendencies from the two axles to the two ends of each torsion spring.

10. The combination of claim 9 in which the radius rods are adjustable for length to take up slack in the chains, the shackling pins having a slide allowance in correspondence with the permitted adjustment of the radius rods.

11. Vehicle construction according to claim 9 wherein the journal mounting for the levers is comprised of respective brackets hung from the frame and providing thread bearings, and threaded thimbles working in the threads of the bearings and fixedly secured to the levers.

12. As suspension mechanism for a vehicle wheel, the combination with the wheel, its axle, and a vehicle frame: a perch fixed to the axle; a frame-carried lever having a forked hub journaled in the approximate vertical plane of the axle for rocker movement about a longitudinal axis, the journal mounting therefor comprising an internally-threaded bearing fixedly hung from the frame to lie between the fork arms of said hub and a threaded thimble fixedly secured to the fork arms and working in the threads of the bearing; shackle links between the perch and the free end of the lever; and a torsion spring operatively coupled as a spring load to the lever.

13. Structure according to claim 12, the thimble having a through-bore and being carried through the hub parts of the fork arms, and wherein there is provided a member constituting an integral extension of one of said hub parts prolonging the hub on an axis coinciding with the bearing axis and which is center-bored to register with the through-bore of the thimble, the torsion spring being received through said registering bores and being coupled to the said prolongation at the outer extreme of the latter.

14. In vehicle construction, a suspension arrangement for a through-axle comprising, in combination with the axle, and with a vehicle main frame: a frame-carried radius-rod engaging the axle and guiding the latter for vertical swinging movements about the frame end of the rod as an axis; a lever supported by the frame for rocker movement about an axis fixed in relation to the frame; a shackle connection from the axle to the free end of the lever; and torsion-spring mechanism connected to and placing a spring load upon the lever to yieldingly resist vertical movements of the axle, said frame excepting for the radius rod and said shackle connection being unattached to the axle.

15. As a spring suspension for a tandem-axle vehicle, and in combination with the vehicle main frame, and with tandem rear axles which are in each instance a through-axle assuring bodily movement of each said axle with the two vehicle wheels carried thereby: means connecting each end of the axles with the vehicle frame and serving as guides holding the two axles to vertical movements in a respective given path; a pair of levers supported by the frame at each side thereof for rocker movements about axes fixed in relation to the frame; connection from one lever of each pair to a related end of one of the axles and from the other lever of a pair to the related end of the other axle functioning by vertical movements of the axles to impart wrist movements to the related levers; and torsion-spring mechanism applied as a cushion-coupling interconnecting the two levers of each pair and arranged and adapted by its resistance to torsional wind-up to yieldingly oppose like directive movements of the axles.

16. A a spring suspension for a tandem-axle vehicle, and in combination with the vehicle main frame, and with tandem rear axles supporting the vehicle wheels and which are in each instance of a nature holding the wheels at all times in axial coincidence: guiding means holding the axles to vertical movements in a respective given path; a pair of levers supported at each side of the frame for rocker movements about axes fixed in relation to the frame; connection from one lever of each pair to a related end of one of the axles and from the other lever of a pair to the related end of the other axle functioning by vertical movements of the axles to impart wrist movements to the related levers; and torsion-spring mechanism applied as a cushion-coupling interconnecting the two levers of each pair and arranged and adapted by the resistance thereof to torsional wind-up to yieldingly oppose like directive movements of the axles.

17. Structure according to claim 16 in which the guiding means are comprised, for each axle, of a pair of radius rods one engaging one end and the other the opposite end of the axle and, considered in top plan, disposed to extend in opposite directions from the longitudinal center line of the frame oblique thereto.

18. Structure according to claim 16 in which the guiding means guide the axles for vertical swinging movements about a frame axis longitudinally offset from the axles, and wherein means are provided in the connections between axles and levers compensating for swing-responsive longitudinal shifting of the axles.

19. As a spring suspension for a tandem-axle vehicle, and in combination with a vehicle main frame, and with the wheel-supporting tandem rear axles, said axles being each of a nature acting at all times to hold the axis of the vehicle wheel which is supported at one end of the axle in fixed relation to the axis of the wheel supported at the other end of the axle: a pair of levers journaled at each side of the frame for rocker movements about axes fixed in relation to the frame; connection from one lever of each pair to a related end of one of the axles and from the other lever of a pair to the related end of the other axle functioning by vertical movements of the axles to impart wrist movements to the related levers; torsion-spring mechanism applied as a cushion-coupling interconnecting the two levers of each pair and arranged and adapted by the resistance thereof to torsional wind-up to yieldingly oppose like directive movements of the two axles; and means independent of the connections from axles to levers guidably holding the axles to vertical movements in respective given paths.

20. As a spring suspension for the axle of a vehicle, and in combination with said axle, and a vehicle main frame: a lever carried by the frame for rocker movements about an axis fixed in relation to the frame; connection from the axle to the lever functioning by vertical movements of the axle to impart wrist movements to the lever; torsion-spring mechanism connected to and placing a spring load upon the lever to yieldingly resist vertical movements of the axle; and means guiding the axle in the course of its vertical movements causing the same to shift longitudinally in relation to the frame, means being provided in the connection between the lever and the axle compensating for said longitudinal shifting movements of the latter.

JOHN G. HOLMSTROM.
WALLACE M. BROWN.